Figure 2:
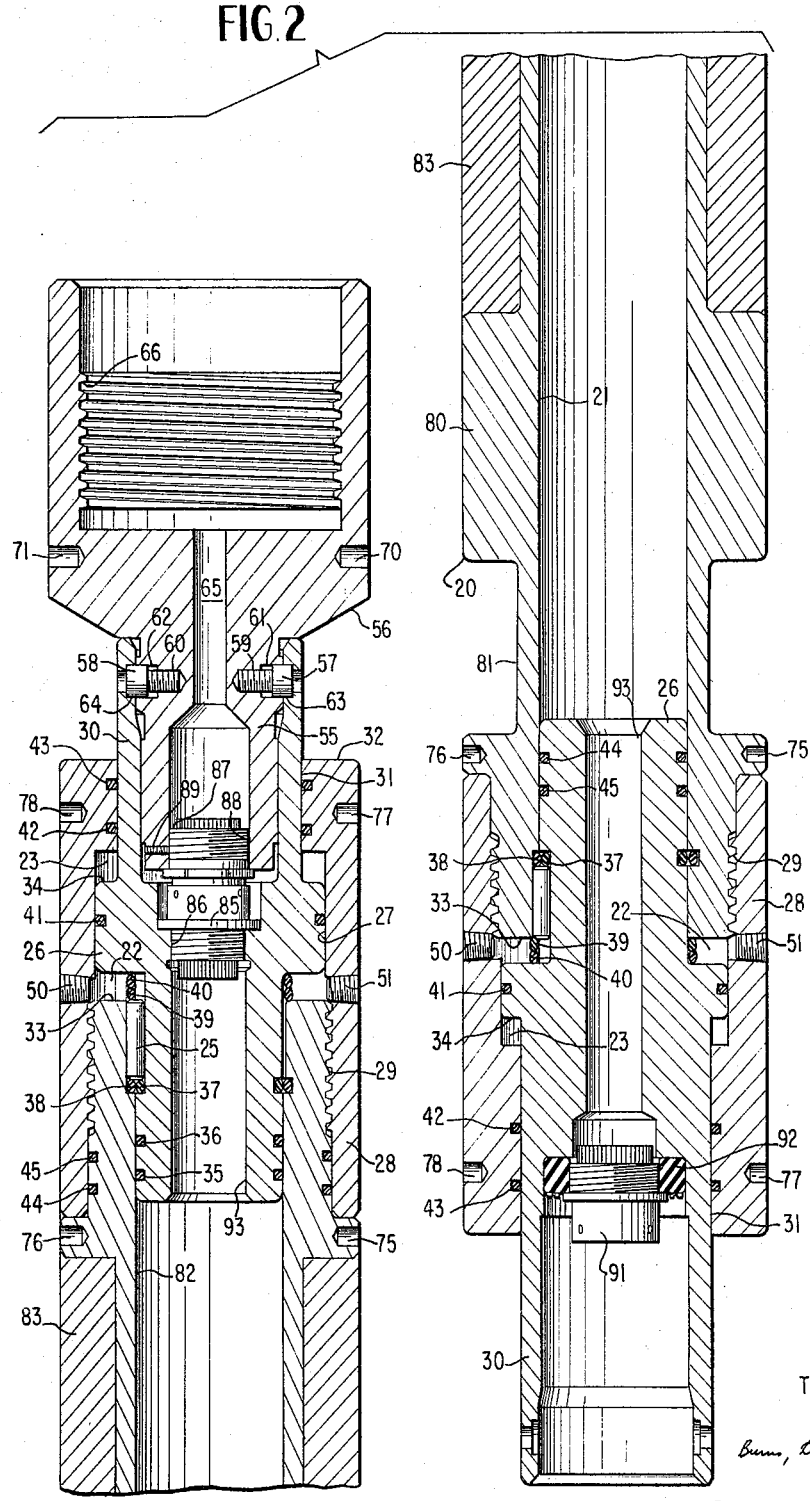

Nov. 29, 1966   T. O. ANDERSON   3,288,245
RIGID ACOUSTICALLY ISOLATED WELL LOGGING TOOL
Filed Dec. 4, 1964

INVENTOR
TERRY O. ANDERSON

BY   ATTORNEYS

United States Patent Office 3,288,245
Patented Nov. 29, 1966

---

3,288,245
RIGID ACOUSTICALLY ISOLATED WELL LOGGING TOOL
Terry O. Anderson, Duncan, Okla., assignor to Halliburton Company, Duncan, Okla., a corporation of Delaware
Filed Dec. 4, 1964, Ser. No. 415,902
12 Claims. (Cl. 181—.5)

The present invention relates to sondes for acoustic or seismic well logging. Sondes employed for this type of exploration include a seismic pulse transmitter and, spaced therefrom, one or more receivers. If the receivers are not isolated from the direct transmission of the seismic impulse through the sonde structure, it becomes difficult, if not impossible, to detect all the desired signal after its propagation through the casing and/or the formation surrounding the well bore.

There are many structures physically suitable for attenuating or reflecting compressional disturbances propagating therethrough. Few, if any, of these conventional configurations are at all suitable for incorporation in an acoustic well logging sonde.

An acoustic sonde as employed in well logging is subjected to tremendous hydrostatic pressure at extended depths. The sonde, moreover, is subject to high impact loads during normal usage in logging a well. In some situations, obstructions are encountered which may require down well spudding operations to obtain passage of the sonde to the logging depth. Therefore, while the isolating element is usually in tension, it must be able to withstand severe impact and compressional loads. Surface handling of the sonde also presents serious flexing loads, and although these can be met by auxiliary cradling members until the sonde is raised and positioned in tension from its supporting cable, this is a highly inconvenient procedure. In distinction to other isolating constructions the isolator of the present invention effectively withstands normal surface handling, although other portions of the sonde may require removable reinforcement.

The rigid acoustic isolator of the present invention is unusually sturdy and has proved of rugged construction satisfactory for field usage. At the same time, it presents very high isolation for propagation of compressional waves.

It is therefore an object of the present invention to provide an isolator for a seismic well logging sonde for isolating the transmitter from the receiving equipment.

Another object of the invention is to provide a rigid acoustic isolator for sonic well logging.

Figure 1:
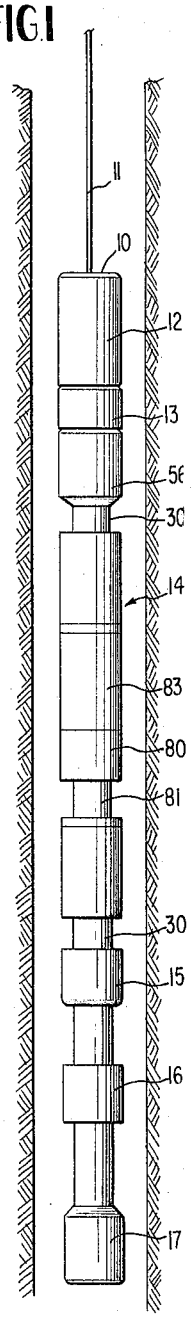

Other objects and advantages of the invention will be further apparent from the description of the preferred embodiment thereof as shown in the drawings, in which:

FIGURE 1 is a diagrammatic showing of the sonde for use in acoustic well logging, and FIGURE 2 is a cross-sectional view of the isolator element included in the sonde of FIGURE 1.

As shown in FIGURE 1, sonde 10 is supported by hoisting cable 11 which normally includes one or more insulated conductors for supplying power to the sonde from the surface installation and for conducting the detected seismic signals to the surface where they are normally recorded when a well is logged. The upper portion 12 of the sonde comprises a hollow casing in which the down well electronic equipment is mounted. Below casing section 12 is positioned the transmitting tansducer 13, which may be an annular piezoelectric element which is recurrently shock excited for generating the seismic pulses. While many types of transmitters are employed for seismic logging, such an element is usually aligned axially of the sonde and is coupled to the bore fluid through a suitable liquid retained inside a circumferential flexible boot portion at the outer surface of the sonde.

Below the transmitter 13 is positioned the acoustic isolator 14 which will be described in detail below. Below the isolator are placed receiving transducers, shown diagrammatically at 15, 16 and 17, to detect the seismic waves transmitted from the transmitter through the bore fluids to the formation, and after propagation through the formation transmitted back through the fluid to the receivers.

The sonde shown in FIGURE 1 incorporates three receivers to permit the logging engineer to measure the velocity of propagation through the formation over several different lengths of travel path. Thus, the first two receivers may be placed one foot apart in the sonde to permit measurement of the relative arrival times of the seismic signal to provide an indication of the propagation time through a single foot of the formation. The third receiver 17 may be positioned two feet from receiver 16 to provide measurements over this distance. In this configuration, the relative arrival times between the uppermost receiver 15 and bottom receiver 17 relate to a travel path of three feet. The arrangement shown is particularly useful for velocity logging, it can also be used for amplitude logging, for bond logging, or to provide for reproduction of the received signal for any one or more of the received signals at the surface installation.

Regardless of the type of seismic logging being practiced, it is obviously desirable to isolate receivers 15, 16 and 17 from the direct compressional wave which would normally be propagated through the structure of the sonde itself. This signal would constitute no useful information, and in most cases would arrive with such high amplitude as would be likely to saturate the amplifiers used in the sonde, or otherwise obscure the desired data.

The acoustic isolator of the present invention operates to reflect compressional wave energy by impedance discontinuities at liquid-solid interfaces. Vibrational forces directed longitudinally of the isolator can propagate only through the impedance mismatched interfaces and this construction, it has been found, affords highly efficient attenuation of the amplitude of longitudinal vibrations. At the same time, the liquid is geometrically constrained so that it effectively acts as a rigid body so far as the transmission of static forces is concerned, yielding only to the extent of its compressibility. The low compressibility of the liquid body, in the configuration provided in the isolator, results in over-all rigidity closely approaching the stiffness that would be achieved by all-metal construction.

The isolator element as shown in FIGURE 2 comprises an elongated mandrel 20 containing an axial bore 21. Mandrel 20, as well as the other structural elements to be discussed, will usually be fabricated of metal construction and steel has been employed in the preferred practical embodiment. Inasmuch as the components of the isolator are of annular sections throughout, cross-sectional views are not shown.

In the construction shown, an impedance discontinuity isolator is provided at each end of mandrel 20. Under some circumstances, where sufficient attenuation would be achieved by the use of a single isolator assembly, only one need be used.

Mandrel 20 is coupled between the transmitting transducer as shown at 13 in FIGURE 1 and the receiving elements there shown positioned at the bottom of the sonde. This coupling, so far as longitudinal forces are concerned, includes constrained liquid bodies 22 and 23, as will now be described.

Within the bore 21 of mandrel 20, plunger 24 is slidably received. Key 25 as shown in FIGURE 2 is one of three slidably constraining plunger 24 and mandrel 20 from relative rotation. Prevention of relative rotation is primarily to avoid twisting electrical conductors passing through the isolator.

Plunger 24 is provided at 26 with an annular enlargement slidable as a piston within bore 27 of elongated collar 28 threaded on the end of mandrel 20 at 29. Plunger 24 is reduced in diameter at its outer annular section 30, which is again slidably constrained by inner mating surface 31 of the outer portion 32 of collar 38. It will thus be seen that plunger 24 abuts mandrel 20 with metal-to-metal engagement only in longitudinally disposed mating surfaces which are smoothly machined or honed. Such engagement comprises substantially complete decoupling for the purposes of transmitting longitudinal steady-state and impact forces and compressional vibration energy propagated longitudinally of the isolator.

In the arrangement shown, chambers 33 and 34 are formed at either side of piston element 26 of plunger 24. These chambers are respectively completely filled by liquid 22 and 23. When the chambers are so filled, and then closed to constrain the liquid therein, longitudinal forces are transmitted through the liquid as they develop between plunger 24 and mandrel 20. Steady-state forces are transmitted fully and the assembly acts essentially as a rigid body thereunder. At the same time, the impedance of the metallic elements of the combination to longitudinal compressional energy differs widely from that offered by the fluid bodies 22 and 23, and the resultant impedance discontinuity at their interfaces greatly attenuates the propagated energy at the frequencies employed in seismic well logging. The compressional wave energy transmitted by the transducers employed ranges from as low as 3 or 4 kilocycles to 40 kilocycles and above.

In order to seal the chambers and constrain the liquid bodies 22 and 23, suitable sealing rings of substantially circular cross section are employed between the mating metallic surfaces, as shown at 35 through 43 inclusive. Rings 42 and 43 additionally seal fluid body 23 from external hydrostatic pressure. Sealing rings 44 through 47 are further provided as hydrostatic seals to prevent undesirable entry of bore fluids into the isolator assembly.

Chamber 33 containing fluid body 22 is sealed with a pair of diametrically opposed pipe plugs 50 and 51 respectively. Chamber 34 is similarly provided with a pair of diametrically opposed access plugs, although these do not show in the drawing, inasmuch as they are oriented at ninety degrees from plugs 50 and 51.

In setting up the isolator, the pipe plugs are removed to provide access to the chambers, and plunger 24 is positioned within mandrel 20 to establish the desired axial length of the isolating unit at a standardized calibrating operative distance between the transmitter and receiving transducers, whereupon the chambers 34 and 35 are completely filled with liquid and sealed in that condition by seating the plugs in the access apertures.

Any non-corrosive liquid, preferably of low compressibility, may be used. Petroleum oils or silicone oil are satisfactory. Lower leakage tendency is achieved by using a thixotropic liquid, such as an automotive grease, for the liquid bodies. The access plug bores to chambers 34 and 35 can be provided with standard pipe thread accepting a conventional grease fitting, so that the chambers may be filled with a grease gun extremely conveniently.

Due to the presence of corrosive bore fluids encountered in many logging operations, it is advisable to change the fluid comprising bodies 22 and 23 at appropriate intervals. This can be accomplished by removing the access plugs, installing a grease fitting for each chamber, displacing the fluid bodies with new grease by gun injection, and then reinstalling the access plugs. As the sealing plugs are installed in their tapered threaded seats, a slight final compression of the fluid bodies will be automatically achieved. This operation can be easily effected in the field if care is exercised to see that all entrained air is eliminated from the liquid chambers. When the chambers 34 and 35 are sealed, it will be seen that mandrel 20 is constrained against relative longitudinal movement of plunger 24 only by the fluid bodies 22 and 23. The keys, one of which is shown at 25, prevent mutual rotation of mandrel 20 and plunger 24.

The outer end 30 of plunger 24 is internally sized to receive neck 55 of connector 56 to couple the isolator with the transmitter structure of the sonde. Neck 55 slides into extension 30 where it is sealed against the entry of external hydrostatic pressure by sealing rings 46 and 47. Locking screws 57 and 58 are threaded into bores 59 and 60 of neck 55, counterbored at 61 and 62 to receive the head of the screws. Upon assembly and alignment with bores 63 and 64 of plunger extension 30, the screws are unscrewed in their bores to lock connector 56 with plunger 24.

Connector 56 is provided with bore 65 for passing the necessary electrical conductors to the receiving transducers, and is internally threaded at 66 to receive the transmitter assembly with the upper portion of the sonde.

Bores 70 and 71 are provided externally of connector 56 to receive a spanner when coupling threads 66. Similarly, mandrel 20 is provided with bores 75 and 76 which, with bore 77 and 78 of collar 28, may be used to couple or uncouple threaded connection 29.

The wall thickness of mandrel 20 may, if desired, be varied to produce further attenuation in the transmission of compressional wave energy propagated longitudinally. As shown in the drawings, the sections of differing wall thickness portions tend to act in the nature of lumped impedance elements which are coupled together with further impedance discontinuity. Thus, section 80 of mandrel 20 is relatively thick, while sections 81 and 82 are provided with thin walls.

To further attenuate the longitudinally propagated vibration, a lead annulus 83 may be attached overlying thin wall section 82 to introduce further losses. The contacting surface of the mandrel is first tinned, and the lead cast around it to obtain a good acoustic bond.

The isolator of the present invention is adapted to incorporate suitable electrical connectors, and for this purpose plug 85 may be threaded into bore 93 of plunger 24 at 86, oriented to receive mating electrodes of plug 87 threaded at 88 in bore 65 of connector 56 and suitably locked by set screw 88.

Adjoining the outer end of section 81 of mandrel 20 is a second impedance discontinuity attenuator, normally used where high attenuation is desirable. This includes plug 91 mounted on collar 92 carried by plunger 24 for connecting to the receiving circuitry. The wiring between plugs 91 and 85 is not shown in the drawing. Since this attenuator assembly is otherwise entirely identical with components above described in detail, similar reference numerals have been applied, but further description is deemed unnecessary.

This assembly is supplied with a terminal slip-in fitting for connection of the receiving equipment to be supplied with the sonde. If the second isolating assembly is not used, section 81 of mandrel 20 would be so adapted, with its structure terminated at the outer end of constricted section 81.

The present invention accordingly provides a sonic isolator employing a pair of constrained liquid bodies positioned in expansible chambers mechanically coupled for reciprocal volume variation. Therefore, whether the isolator is in tension or in compression, it acts as a substantially inextensible rigid body, at the same time highly attenuating longitudinally propagated vibrational energy due to the inherent impedance discontinuities established at the solid-liquid interfaces. At the same time, all metallic mated surfaces are axially disposed to avoid any substantial coupling of solid elements for longitudinal forces, vibrational or steady-state. The isolator has provided excellent stability of its longitudinal dimension so that sonde calibration is not deteriorated by variation in spacing between the transmitting and receiving transducers. The decoupling achieved permits detection of seismic signals by the receiving equipment at high sensitivity levels free of interference from sonde-borne signal components.

While the concept of the present invention could be embodied in many diverse structural configurations, the scope of the invention will be ascertained with reference to the appended claims.

I claim:
1. An acoustic well logging sonde including:
spaced transducer means connected by a rigid compressional wave isolating longitudinal coupling assembly comprising:
first solid member means having longitudinally disposed surfaces,
second solid member means slidably engaged thereby only on longitudinally disposed mating surfaces,
sealed solid walled expansive chamber means coupled between the two solid member means for volume variation in dependency on their relative longitudinal positions,
and liquid body means completely filling the expansive chamber means providing at liquid-solid interfaces an impedance discontinuity to the longitudinal propagation of compressional wave energy through the coupling assembly.

2. In an acoustic well logging sonde,
a rigid compressional wave isolating longitudinal coupling assembly comprising:
first solid member means having longitudinally disposed surfaces,
second solid member means slidably engaged thereby only on longitudinally disposed mating surfaces,
sealed expansive chamber means formed between the two solid member means of a volume varying in dependency on their relative longitudinal positions,
and liquid body means completely filling the chamber means providing at liquid-solid interfaces an impedance discontinuity to the longitudinal propagation of compressional wave energy through the coupling assembly.

3. In an acoustic well logging sonde,
a rigid compressional wave isolating longitudinal coupling assembly comprising:
first solid member means having longitudinally disposed surfaces,
second solid member means slidably engaged thereby only on longitudinally disposed mating surfaces,
a pair of mechanically coupled sealed expansive chambers formed between the two solid member means, each of a volume varying in dependency on the relative longitudinal positions of the solid member means and mechanically coupled to the other for reciprocal volume variation,
and liquid body means completely filling both chambers providing at liquid-solid interfaces an impedance discontinuity to the longitudinal propagation of the compressional wave energy through the coupling assembly.

4. In an acoustic well logging sonde,
a rigid compressional wave isolating longitudinal coupling assembly comprising:
first solid member means having axially aligned cylindrical interior surface means,
second solid member means slidably engaging said cylindrical surface means at three axially spaced annular zones,
the diameter of the center annular engagement zone being substantially different from that of either end annular engagement zone to provide two mechanically coupled sealed expansive chambers of volumes varying in dependency on the relative longitudinal positions of the solid member means,
and liquid body means completely filling the chambers providing at liquid-solid interfaces an impedance discontinuity to the longitudinal propagation of compressional wave energy through the coupling assembly.

5. In an acoustic well logging sonde,
a rigid compressional wave isolating longitudinal coupling assembly comprising:
first solid member means having axially aligned cylindrical interior surface means,
second solid member means slidably engaging said cylindrical surface means at three axially spaced annular zones,
the diameter of the central annular engagement zone being substantially different from that of either end annular engagement zone and said central annular engagement zone being radially displaced from both end annular engagement zones to provide two mechanically coupled sealed expansive chambers of volumes reciprocally varying in dependency on the relative longitudinal positions of the solid member means,
and liquid body means completely filling the chambers providing at liquid-solid interfaces an impedance discontinuity to the longitudinal propagation of compressional wave energy through the coupling assembly.

6. The structure of claim 5 further including,
a hollow longitudinally extended portion of one solid member means comprising sections having different radial wall thicknesses.

7. The structure of claim 5 further including,
a hollow longitudinally extended portion of one solid member means comprising sections having different radial wall thicknesses, and
a lead sheath acoustically bonded to one of said sections.

8. The structure of claim 5 further including,
a longitudinally extended portion of one solid member means, and
a lead sheath acoustically bonded externally to at least a section of said portion.

9. The structure of claim 5 further including,
engagement means operative to prevent rotation of one solid member relative to the other.

10. The structure of claim 5 further including,
sealing means providing access to each chamber at diametrically opposite points to permit insertion of the liquid body means.

11. The assembly of claim 5 further including,
third solid member means slidably engaging the first solid member means only along longitudinally disposed mating surfaces,
sealed solid walled chamber means coupled between the first and third solid member means for volume variation in dependency on their relative longitudinal positions,
and further liquid body means completely filling the expansive chamber means between the first and third solid member means providing at liquid-solid interfaces an impedance discontinuity to the longitudinal propagation of compressional wave energy through the coupling assembly.

12. A rigid compressional wave isolating longitudinal coupling assembly comprising:

first solid member means having longitudinally disposed surfaces, second solid member means slidably engaged thereby only on longitudinally disposed mating surfaces, sealed solid walled expansive chamber means coupled between the two solid member means for volume variation in dependency on their relative longitudinal positions, and liquid body means completely filling the expansive chamber means providing at liquid-solid interfaces an impedance discontinuity to the longitudinal propagation of compressional wave energy through the coupling assembly.

References Cited by the Examiner

UNITED STATES PATENTS

| | | | |
|---|---|---|---|
| 2,757,358 | 7/1956 | Ely | 340—18 |
| 3,213,415 | 10/1965 | Moser et al. | 340—17 |
| 3,231,041 | 1/1966 | Kokesh | 181—.5 |

BENJAMIN A. BORCHELT, *Primary Examiner.*

W. KUJAWA, *Assistant Examiner.*